Sept. 25, 1962
L. KNIEL
3,055,183
ETHYLENE PURIFICATION
Filed Sept. 22, 1958
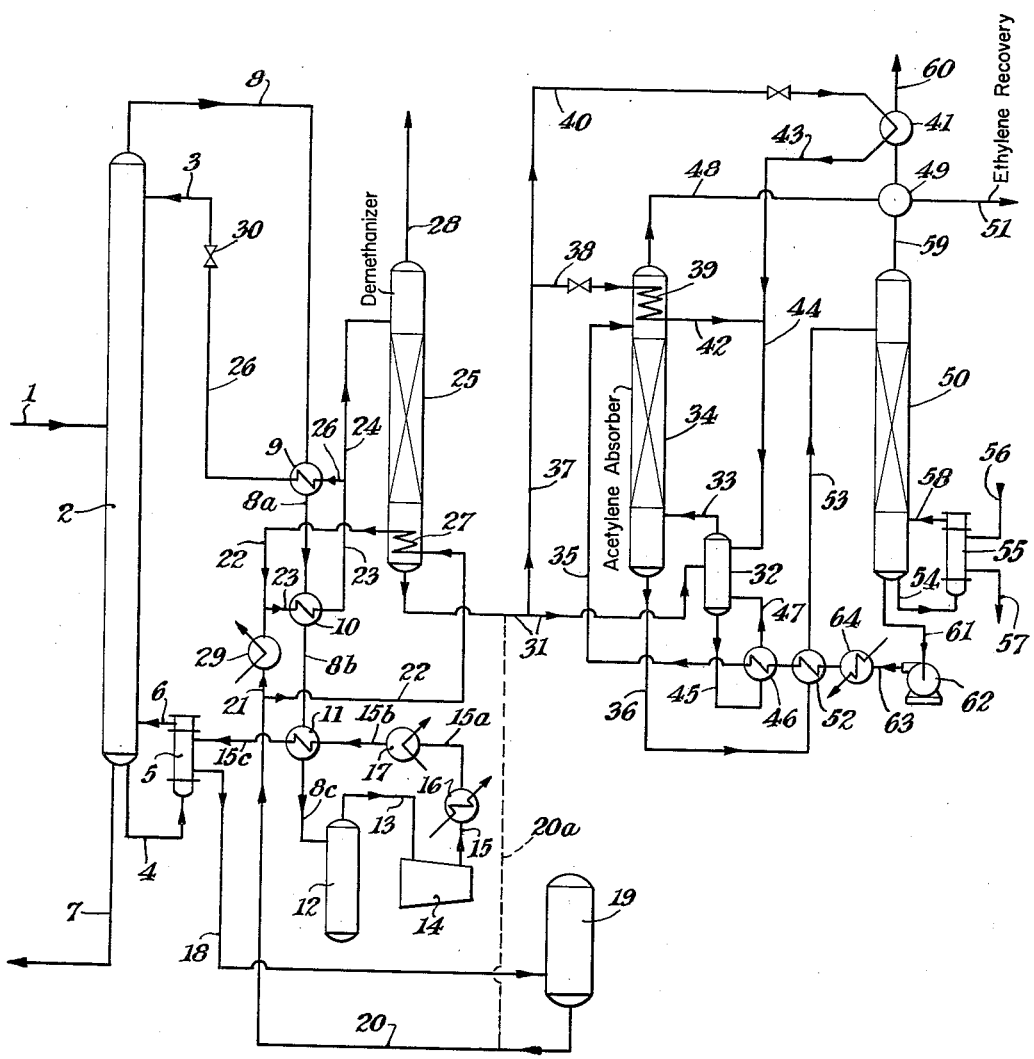
INVENTOR
Ludwig Kniel
BY
Philip D. Junkins
AGENT United States Patent Office 3,055,183
Patented Sept. 25, 1962

3,055,183
ETHYLENE PURIFICATION
Ludwig Kniel, Scarsdale, N.Y., assignor to The Lummus Company, New York, N.Y., a corporation of Delaware
Filed Sept. 22, 1958, Ser. No. 762,497
5 Claims. (Cl. 62—17)

This invention relates to the separation and recovery of ethylene from hydrocarbon mixtures and more particularly relates to an improved process for the recovery of high purity ethylene.

As described in U.S. Patent No. 2,573,341, ethylene may be separated from the various gaseous mixtures recovered as off-gases from refinery units, where such gases offer a very large potential supply of hydrocarbons which do not occur naturally and which are of great importance in the synthetic chemical field. Ethylene may also be produced by the pyrolysis of ethane, propane and heavier hydrocarbons in the presence of a hot refractory material or in tubular furnaces.

Ethylene is useful not only in the manufacture of synthetic alcohols and rubber but also for certain types of plastics and many other purposes. In some of the uses, the purity of the ethylene may be as low as 95 mole percent, whereas in other applications the purity must be at least 99.5 mole percent and in some instances as high as 99.9 mole percent, since minor quantities of hydrocarbon contaminants in the ethylene have a deleterious effect on the desired end product, for instance in the manufacture of polyethylene, minor quantities of acetylene in the ethylene are undesirable.

Ethylene, however, is very difficult to separate from the other gases such as ethane with which it is normally associated. In addition, large amounts of contaminate gases such as methane and hydrogen usually found in refinery off-gases or gases produced during pyrolytic conversion of hydrocarbon feeds, necessitate the use of large and expensive equipment for the separation and purification of ethylene. Furthermore, variations in the concentration of the components in the various hydrocarbon fractions have made it extremely expensive to construct a single system which would have general application to the recovery of olefinic hydrocarbons from various refinery off-gases. On the other hand, pyrolytic conversions of hydrocarbons, such as ethane and propane, produce pyrolytic gases having little variation in composition and thus permit a unitary system to be more easily constructed.

It is a principal object of my invention to provide an efficient and economical method for separating and purifying ethylene from a gaseous mixture utilizing an improved purification system which permits recovery of an ethylene product having a purity of at least 99.5 mole percent ethylene.

Other objects and a fuller understanding of the invention may be had by referring to the following description taken in conjunction with the accompanying drawing, in which the figure is a schematic flow diagram illustrating a preferred embodiment of my invention for separating and recovering high purity ethylene from a gaseous hydrocarbon mixture.

In accordance with my invention, I propose to economically recover and purify ethylene from a gaseous mixture such as obtained from the pyrolytic conversion of various hydrocarbons. Particularly, my invention is applicable to the separation of a pyrolytic gas wherein hydrogen and a portion of the methane and $C_3+$ hydrocarbons contained therein have been preliminarily removed in conventional separation stages to provide a feed gas for my purification system from which high purity ethylene, i.e. of at least 99.5 mole percent purity is recovered.

Table I, below, gives analyses of typical cracked gases obtained by the pyrolytic conversion of various hydrocarbons.

TABLE I

[Composition in mole percent]

| Charge Stock | Ethane | Propane | |
|---|---|---|---|
| Type of Cracking | (1) | (1) | (2) |
| Temperature, ° F | 1,550 | 1,470 | 1,785 |
| Pressure, p.s.i.g | 23 | 17 | 10 |
| Example | A | B | C |
| Component: | | | |
| Hydrogen | 34.0 | 13.1 | 30.3 |
| Nitrogen | | | 5.4 |
| Carbon monoxide | | | 1.2 |
| Carbon dioxide | 0.2 | | 0.9 |
| Methane | 8.5 | 29.4 | 23.8 |
| Acetylene | 0.5 | 0.2 | 6.2 |
| Ethylene | 32.7 | 25.3 | 24.7 |
| Ethane | 21.8 | 7.2 | 1.0 |
| Methylacetylene | | | 0.7 |
| Propane and Propylene | 1.0 | 21.9 | 4.2 |
| Diacetylene | | | 0.1 |
| Butane and Butenes | 0.4 | 1.4 | 0.2 |
| Heavier hydrocarbons | 0.9 | 1.5 | 1.3 |
| Total | 100.0 | 100.0 | 100.0 |

[1] Tubular.
[2] Regenerative.

Prior to treatment in my purification system, a pyrolytic gaseous mixture such as illustrated by Example A of Table I may be preliminarily treated to remove undesirable components which have a tendency to foul processing equipment and generally make the recovery of ethylene more difficult. Typical of undesirable components which may be removed are carbon dioxide, water, tar-like materials and liquid aromatics. Following the removal of these undesirable components, hydrogen and a portion of the $C_3+$ hydrocarbons may be removed from the pyrolytic gaseous mixture to provide the feed to my separation system, such feed normally containing at least 30 mole percent ethylene. The portion of the $C_3+$ hydrocarbons removed from the pyrolytic gaseous mixture may be returned to a pyrolysis unit as a portion of the pyrolysis charge. If a $C_2/C_3$ separation of the pyrolytic gaseous mixture is performed, an important advantage results in that a $C_2/C_3$ separation would eliminate the necessity of a subsequent separation of ethylene and propylene from their mixture. It is not necessary, however, to remove substantially all of the $C_3$ and heavier hydrocarbons prior to the introduction of the hydrocarbon mixture into my purification unit.

I propose to separate and recover high purity ethylene from a preliminarily treated gaseous hydrocarbon mixture, having hydrogen and a major portion of the $C_3+$ hydrocarbons removed therefrom, by first separating in an ethylene fractionator, ethane and the $C_3+$ hydrocarbons from the gaseous mixture. The overhead product leaving the ethylene fractionator is condensed to form a sub-cooled ethylene enriched liquid mixture which may be introduced into a methane stripper. The ethylene enriched liquid is at a higher pressure than the pressure in the methane stripper, with the stripper being maintained at a pressure so as to strip substantially all of the methane from the liquid. The overhead from the methane stripper may be conveniently recycled to a unit ahead of the methane elimination step. The bottoms leaving the methane stripper is primarily comprised of ethylene with a minor quantity of acetylene. The acetylene may be conveniently removed in a solvent absorption system. The ethylene fractionator and acetylene absorber are operated at such a pressure differential that by flashing the liquid ethylene at the lower of the two pressures, the refrigeration requirements for the solvent absorption system are satisfied, i.e. the steps of sub-cooling the solvent, condensing solvent in the solvent stripper overhead, prestripping (if necessary) the enriched solvent, and condensing the solvent in the ethylene effluent leaving the acetylene absorber.

It is generally contemplated that the methane stripping step may be eliminated if the purity of the ethylene product is to be of the order of about 97 mole percent.

A distinct advantage of the processing steps described above and more fully hereinafter described is that the bottoms from the methane stripper may be placed in storage for any duration of time prior to the final acetylene solvent absorption stage. Thus, the acetylene removal equipment is not dependent on the upstream components of the purification system and high purity ethylene (at least 99.5 mole percent and as high as 99.9 mole percent) may be furnished to various consumer units while the upstream components of the purification system ahead of the acetylene solvent absorption stage are not in operation.

Referring to the drawing, a hydrocarbon mixture, preferably of the type described above, is introduced through line 1 into fractionating tower 2. A heat balance is maintained over the fractionator 2 by refrigerated reflux in line 3 entering the upper portion of the tower and by the bottoms in line 4 which pass through reboiler 5 and are heated to the desired temperature level prior to reintroduction into tower 2 through line 6. Fractionator 2 is maintained at a temperature and pressure whereby ethane and heavier hydrocarbons are condensed from the feed gas as net bottoms 7, with such bottoms being recycled or returned, for example, to a pyrolysis unit (not shown) for reprocessing.

The tower overhead gas in line 8, including line sections 8a, 8b and 8c (primarily comprising ethylene with minor quantities of methane, ethane and acetylene contained therein), leaving fractionator 2 passes through a series of heat exchangers 9, 10 and 11, wherein such stream is heated by indirect heat exchange with various process streams as hereinafter described. The gaseous stream enters suction drum 12 and is passed through line 13 to compressor 14. The compressed gases leave compressor 14 through line 15, including line sections 15a, 15b and 15c, pass through cooler 16, refrigerated cooler 17 and heat exchanger 11, whereby the mixture is partially condensed. The partially condensed mixture in line 15c is thereafter introduced into reboiler 5 and is passed in indirect heat exchange therein with the bottoms in line 4 to provide the necessary heat input to the tower 2 while simultaneously completing condensation of such mixture. The quantity of heat introduced into reboiler 5 is balanced by the quantity of heat removed in the tower overhead in line 8. The heat level of the partially condensed mixture in line 15c is primarily controlled by its passage through refrigerated cooler 17. The ethylene enriched condensate leaves reboiler 5 through line 18 and enters storage tank 19.

The ethylene enriched condensate leaving tank 19 as a single stream in line 20 is: (1) divided into condensate portions 21 and 22 which, after heat exchange as hereinafter described, are recombined as a single stream in line 23; (2) passed through exchanger 10; and (3) split to provide the net condensate to be treated (line 24) in demethanizer 25 and the reflux requirements (line 26) for fractionator 2. The portion of the condensate in line 22 is passed through coils 27 in the lower portion of methane stripper 25 to provide the necessary heat input to strip substantially all of the methane present in the net condensate entering tower 25 through line 24. The gaseous overhead leaving demethanizer 25 in line 28 is primarily comprised of methane and ethylene and may be returned to an upstream processing unit (not shown) as described hereinbefore. The divided portion of condensate in line 21 is passed through refrigerated exchanger 29 and then is recombined in line 23 with the divided portion of condensate passing through line 22. The portion of condensate (line 26) comprising the reflux requirements for fractionator 2 passes through exchanger 9 and valve 30 prior to entry into tower 2 through line 3.

Demethanizer bottoms in line 31 (primarily ethylene with minor quantities of acetylene) are passed to a flash drum 32. As previously mentioned, the demethanizer bottoms may be conveniently stored prior to introduction into the flash drum 32. The final purification stage, wherein substantially all of the acetylene remaining in the ethylene is removed, may be performed as required by the various ethylene consumer units (not shown). The ethylene enriched liquid in drum 32 is vaporized and is passed through line 33 into acetylene absorber 34. The removal of acetylene from the gas entering through line 33 is made considerably easier in absorber 34, since the difficult separation between acetylene and its homologs has been previously performed.

Acetylene absorption may be accomplished by utilizing any of the well known selective solvents, such as anhydrous ammonia, acetone, dimethylformamide, butyrolactone or the like. A sufficient quantity of solvent is introduced through line 35 into the upper portion of absorber 34. The fractionator 2 and absorber 34 are operated at such a presure differential that by flashing the liquid ethylene at the lower of the two pressures, the refrigeration requirements for the solvent absorption system are satisfied. By carefully controlling the quantity of solvent introduced into absorber 34, the absorber bottoms in line 36 contain (in addition to the acetylene dissolved in the solvent) only minor quantities of ethylene.

A portion of the demethanizer bottoms in line 31 is passed (prior to introduction into flash drum 32) through line 37 and split, with a portion thereof passing through line 38 to coil 39 located in the upper portion of tower 34, with the remaining portion passing through line 40 to heat exchanger 41. The portion passing through the coil 39 in absorber 34 removes sufficient heat so that a part of the ethylene vapor is condensed to provide the reflux requirements for absorber 34 and to inhibit solvent carryover with product ethylene. The portion passing through heat exchanger 41 recovers heat as hereinafter described. The portion leaving absorber coils 39 through line 42 and the portion leaving exchanger 41 through line 43 are recombined in line 44 and introduced into flash drum 32. In order to insure that all of the liquid entering drum 32 is vaporized at the pressure level within the drum, a portion of the liquid may be passed through line 45 into heat exchanger 46 wherein heat is absorbed through indirect heat exchange as hereinafter described, with the heated portion being thereafter reintroduced through line 47 into drum 32.

The overhead gaseous stream leaving tower 34 through line 48 is introduced into heat exchanger 49 wherein the gaseous stream passes in indirect heat exchange with the overhead off-gas leaving acetylene stripper 50 and is withdrawn from heat exchanger 49 through line 51 and constitutes the high purity ethylene product having a purity of at least 99.5 mole percent or higher.

The absorber bottoms in line 36 are passed through heat exchanger 52 and line 53 and are introduced into acetylene stripper 50. Stripper bottoms in line 54 pass through reboiler 55, which is heated by steam entering through line 56 and leaving through line 57, and are reintroduced into stripper 50 through line 58 at such a heat level so as to strip acetylene from the solvent. Acetylene (having only minor quantities of ethylene) leaves tower 50 as an overhead gas in line 59 and passes through heat exchangers 49 and 41 wherein such gas is cooled to reduce solvent losses therein and to provide a portion of the heat required (exchanger 41) to vaporize the ethylene enriched liquid entering drum 32. An acetylene enriched off-gas is withdrawn from exchanger 41 through line 60.

Stripper bottoms in line 61 are pumped (pump 62) through line 63, heater 64, heat exchangers 52 and 46, and comprise the substantially pure solvent stream entering absorber 34 through line 35.

Tables II and III are illustrative of the process streams and operational requirements, respectively, of the process route depicted in the drawing for recovering high purity ethylene of 99.8 mole percent from a hydrocarbon gaseous mixture.

TABLE II

*Summary of Process Streams*

[Mole percent]

| Components | Designations | | | | | |
|---|---|---|---|---|---|---|
| | Feed (1) | Overhead (8) | Bottoms (7) | Overhead (28) | Product (51) | Overhead (59) |
| Methane | 1.0 | 1.5 | | 24.1 | 0.08 | 66.7 |
| Acetylene | 0.4 | 0.6 | | | | 33.3 |
| Ethylene | 65.0 | 97.7 | 0.6 | 75.9 | 99.76 | |
| Ethane | 33.6 | 0.1 | 99.4 | | .16 | |
| Total | 100.0 | 100.0 | 100.0 | 100.0 | 100.00 | 100.0 |

TABLE III

*Summary of Tower Operating Conditions*

| Designation | Pressure, p.s.i.g. | Temperature, °F. | | |
|---|---|---|---|---|
| | | O.H. | Bottoms | Feed |
| Fractionator (2) | 90 | −80 | −48 | |
| Storage Tank (19) | 255 | −28 | | |
| Methane Stripper (25) | 175 | −38 | −40 | −47 |
| Flash Tank (32) | 60 | −90 | | |
| Acetylene Absorber (34) | 60 | −90 | | [1] −80 |

[1] Solvent.

As previously mentioned, some ethylene consumers require an ethylene feed having a purity of only about 97 mole percent, in which case the ethylene enriched liquid mixture in storage drum 19 may be passed directly by line 20a to the acetylene solvent absorption stage bypassing methane stripper 24.

Table IV is illustrative of the process streams for recovering 97.72 mole percent ethylene wherein the ethylene enriched liquid mixture is passed through line 20a to flash drum 32.

TABLE IV

*Summary of Process Streams*

[Mole percent]

| Components | Designations | | |
|---|---|---|---|
| | Feed (line 20a) | Off-Gas (line 59) | Product (line 51) |
| Methane | 1.19 | | 1.24 |
| Acetylene | 2.19 | 66.38 | |
| Ethylene | 95.61 | 33.62 | 97.72 |
| Ethane | 1.01 | | 1.04 |
| Total | 100.00 | 100.00 | 100.00 |

It will thus be seen that the foregoing system has the following advantages as applied to the purification of ethylene.

(1) Flexibility to take adequate care of wide fluctuations in volume and composition of charge gas.

(2) Recovery of a highly purified product at very small losses.

(3) An acetylene removal step which is independent of the upstream components of the purification system.

(4) A novel method of providing for the refrigeration requirements for the final purification step wherein minor quantities of acetylene are removed from the product gas.

(5) Heat balanced purification system.

(6) Avoidance of special materials of construction.

While I have shown and described a preferred form of my invention, I am aware that variations may be made thereto and I, therefore, desire a broad interpretation of my invention within the scope of the disclosure herein and the following claims.

I claim:

1. A process for recovering high purity ethylene from a normally gaseous mixture thereof which includes as impurities methane, acetylene and heavier hydrocarbons: which comprises passing said mixture in countercurrent relation to refrigerated reflux in a reboiled fractionation zone under superatmospheric pressure and at a temperature whereby substantially all of said heavier hydrocarbons are separated as a liquid bottoms; withdrawing an ethylene enriched gaseous overhead mixture including methane and acetylene from said fractionation zone and compressing said ethylene enriched mixture to a substantially higher pressure than the pressure in said fractionation zone; cooling said compressed mixture by indirectly exchanging heat between said compressed mixture and said gaseous overhead mixture, said compressed mixture and a reboiled portion of said liquid bottoms to form a cool ethylene enriched condensate, said cool condensate being further cooled by indirectly exchanging heat between said cool condensate and said gaseous overhead mixture at a point upstream of the heat exchange between said compressed mixture and said gaseous overhead, a portion of said further cooled condensate comprising the refrigerated reflux for said fractionation zone; passing the net portion of said further cooled condensate, after satisfying said reflux requirements, through a methane stripping zone; maintaining a bottoms temperature in said methane stripping zone sufficient to drive off substantially all of the methane from said net portion of condensate; withdrawing a demethanized ethylene enriched condensate mixture including acetylene from the bottom of said methane stripping zone and introducing said demethanized condensate mixture into a flash zone, said bottoms temperature of said methane stripping zone being maintained by passing a part of the cool condensate through the bottom of said zone in indirect heat exchange relation with said demethanized condensate whereby a portion of said demethanized condensate is vaporized for utilization as a stripping medium and additional heat is removed from said part of the cool condensate; reducing the pressure on said demethanized condensate mixture in said flash zone to form a demethanized ethylene enriched gaseous mixture including acetylene and passing said gaseous mixture through an acetylene absorption zone in countercurrent relation to a selective solvent of sufficient amount to absorb substantially all of the acetylene in said gaseous mixture; and withdrawing substantially pure ethylene as an overhead gas from said absorption zone, a portion of said demethanized condensate being heated prior to introduction into said flash zone by indirectly exchanging heat between said substantially pure gaseous ethylene overhead and said portion of demethanized condensate.

2. A process for recovering high purity ethylene from a normally gaseous mixture thereof which includes as impurities methane, acetylene and heavier hydrocarbons: which comprises passing said mixture in countercurrent relation to refrigerated reflux in a reboiled fractionation zone under superatmospheric pressure and at a temperature whereby substantially all of said heavier hydrocarbons are separated as a liquid bottoms; withdrawing an ethylene enriched gaseous overhead mixture including methane and acetylene from said fractionation zone and compressing said ethylene enriched mixture to a substantially higher pressure than the pressure in said fractionation zone; cooling said compressed mixture by indirectly exchanging heat between said compressed mixture and said gaseous overhead mixture, said compressed mixture and a reboiled portion of said liquid bottoms to form a cool ethylene enriched condensate, said cool condensate being further cooled by indirectly exchanging heat between said cool condensate and said gaseous overhead mixture at a point upstream of the heat exchange between said compressed mixture and said gaseous overhead, a portion of said further cooled condensate comprising the refrigerated reflux for said fractionation zone; passing the net portion of said further cooled condensate, after satisfying said reflux requirements, through a methane stripping zone; maintaining a bottoms temperature in said methane stripping zone sufficient to drive off substantially all of the methane from said net portion of condensate; withdrawing a demethanized ethylene enriched condensate mixture including acetylene from the bottom of said methane stripping zone and introducing said demethanized condensate mixture into a flash zone; reducing the pressure on said demethanized condensate mixture in said flash zone to form a demethanized ethylene enriched gaseous mixture including acetylene and passing said gaseous mixture through an acetylene absorption zone in countercurrent relation to a selective solvent of sufficient amount to absorb substantially all of the acetylene in said gaseous mixture; and withdrawing substantially pure ethylene as an overhead gas from said absorption zone, a portion of said demethanized condensate being heated prior to introduction into said flash zone by indirectly exchanging heat between said substantially pure gaseous ethylene overhead and said portion of demethanized condensate.

3. A process for recovering high purity ethylene from a normally gaseous mixture thereof which includes as impurities methane, acetylene and heavier hydrocarbons: which comprises passing said mixture in countercurrent relation to refrigerated reflux in a reboiled fractionation zone under superatmospheric pressure and at a temperature whereby substantially all of said heavier hydrocarbons are separated as a liquid bottoms; withdrawing an ethylene enriched gaseous overhead mixture including methane and acetylene from said fractionation zone and compressing said ethylene enriched mixture to a substantially higher pressure than the pressure in said fractionation zone; cooling said compressed mixture by indirectly exchanging heat between said compressed mixture and said gaseous overhead mixture, said compressed mixture and a reboiled portion of said liquid bottoms to form a cool ethylene enriched condensate, a portion of said cool condensate comprising the refrigerated reflux for said fractionation zone; passing the net portion of said cool condensate, after satisfying said reflux requirements, through a methane stripping zone; maintaining a bottoms temperature in said methane stripping zone sufficient to drive off substantially all of the methane from said net portion of condensate; withdrawing a demethanized ethylene enriched condensate mixture including acetylene from the bottom of said methane stripping zone and introducing said demethanized condensate mixture into a flash zone; reducing the pressure on said demethanized condensate mixture in said flash zone to form a demethanized ethylene enriched gaseous mixture including acetylene and passing said gaseous mixture through an acetylene absorption zone in countercurrent relation to a selective solvent of sufficient amount to absorb substantially all of the acetylene in said gaseous mixture; and withdrawing substantially pure ethylene as an overhead gas from said absorption zone, a portion of said demethanized condensate being heated prior to introduction into said flash zone by indirectly exchanging heat between said substantially pure gaseous ethylene overhead and said portion of demethanized condensate.

4. A process for recovering high purity ethylene from a normally gaseous mixture thereof which includes as impurities methane, acetylene and heavier hydrocarbons: which comprises passing said mixture in countercurrent relation to refrigerated reflux in a reboiled fractionation zone under superatmospheric pressure and at a temperature whereby substantially all of said heavier hydrocarbons are separated as a liquid bottoms; withdrawing an ethylene enriched gaseous overhead mixture including methane and acetylene from said fractionation zone and compressing said ethylene enriched mixture to a substantially higher pressure than the pressure in said fractionation zone; cooling said compressed mixture to form an ethylene enriched condensate, a portion of said condensate comprising the refrigerated reflux for said fractionation zone; passing the net portion of said condensate, after satisfying said reflux requirements, through a methane stripping zone at a temperature sufficient to drive off substantially all of the methane from said net portion of condensate; withdrawing a demethanized ethylene enriched condensate mixture including acetylene from the bottom of said methane stripping zone and introducing said demethanized condensate mixture into a flash zone; reducing the pressure on said demethanized condensate mixture in said flash zone to form a demethanized ethylene enriched gaseous mixture including acetylene and passing said gaseous mixture through an acetylene absorption zone in countercurrent relation to a selective solvent of sufficient amount to absorb substantially all of the acetylene in said gaseous mixture; and withdrawing substantially pure ethylene as an overhead gas from said absorption zone.

5. A process for recovering high purity ethylene from a normally gaseous mixture thereof which includes as impurities methane, acetylene and heavier hydrocarbons: which comprises passing said mixture in countercurrent relation to refrigerated reflux in a reboiled fractionation zone under superatmospheric pressure and at a temperature whereby substantially all of said heavier hydrocarbons are seperated as a liquid bottoms; withdrawing an ethylene enriched gaseous overhead mixture including methane and acetylene from said fractionation zone and compressing said ethylene enriched mixture to a substantially higher pressure than the pressure in said fractionation zone; cooling said compressed mixture to form an ethylene enriched condensate, a portion of said condensate comprising the refrigerated reflux for said fractionation zone; introducing the net portion of said condensate, after satisfying said reflux requirements, into a flash zone; reducing the pressure on said net portion of condensate in said flash zone to form an ethylene enriched gaseous mixture including methane and acetylene and passing said gaseous mixture through an acetylene absorption zone in countercurrent relation to a selective solvent of sufficient amount to absorb substantially all of the acetylene in said gaseous mixture; and withdrawing substantially pure ethylene as an overhead gas from said absorption zone, a part of said net portion of condensate being heated prior to introduction into said flash zone by indirectly exchanging heat between said substantially pure gaseous ethylene overhead and said part of net portion of condensate.

References Cited in the file of this patent

UNITED STATES PATENTS

| | | |
|---|---|---|
| 2,587,689 | Box | Mar. 4, 1952 |
| 2,600,110 | Hachmuth | June 10, 1952 |
| 2,645,104 | Kneil | July 14, 1953 |
| 2,765,635 | Redcay | Oct. 9, 1956 |
| 2,804,488 | Cobb | Aug. 27, 1957 |
| 2,809,710 | Hachmuch | Oct. 15, 1957 |
| 2,909,038 | Williams | Oct. 20, 1959 |
| 2,915,881 | Irvine | Dec. 8, 1959 |